United States Patent [19]

Allen

[11] 3,964,563
[45] June 22, 1976

[54] WHEEL-SUPPORT STRUCTURE IN VEHICLES

[76] Inventor: Carling D. Allen, 581 N. 640 West, Orem, Utah 84057

[22] Filed: Jan. 29, 1975

[21] Appl. No.: 545,192

[52] U.S. Cl. ................................. 180/27; 180/41; 280/6.11
[51] Int. Cl.² ....................................... B60G 19/02
[58] Field of Search ............ 180/27, 41; 280/112 A, 280/6 R, 6.1, 6.11

[56] References Cited

UNITED STATES PATENTS

| | | | |
|---|---|---|---|
| 1,238,752 | 9/1917 | Flory | 180/41 |
| 1,385,417 | 7/1921 | Wooley | 180/41 |
| 2,458,400 | 1/1949 | Milliken | 180/41 |
| 2,551,314 | 5/1951 | Burton | 180/41 |
| 2,774,435 | 12/1958 | Milliken | 180/41 |
| 2,836,431 | 5/1958 | Brueder | 280/112 A |
| 3,666,036 | 5/1972 | Scerbo | 180/41 X |

FOREIGN PATENTS OR APPLICATIONS

| | | | |
|---|---|---|---|
| 1,319,231 | 4/1962 | France | 180/41 |
| 589,614 | 6/1947 | United Kingdom | 180/41 |

*Primary Examiner*—M. H. Wood, Jr.
*Assistant Examiner*—Terrance L. Siemens

[57] ABSTRACT

A balance suspension system for three-wheel vehicles wherein such system is applicable in particular to the oppositely-reciprocating related wheels of the vehicle. The system is designed such that the vehicle tends to maintain an essentially horizontal position, relative to its transverse axis, even though wheels may pass over bumps or dips or the vehicle itself may be traversing sloping terrain. Structure is provided such that a vertical movement in one of the oppositely-reciprocating wheels is offset by an opposite movement in the remaining wheel whereby the transverse axis of the vehicle is essentially maintained on a horizontal axis. Such precludes the vehicle from dipping or spilling. Further provision is made so that, as the vehicle is cornering, the transverse orientation of the vehicle dips inwardly, tending to oppose centrifugal force and thereby maintain the integrity of vehicle travel.

6 Claims, 12 Drawing Figures

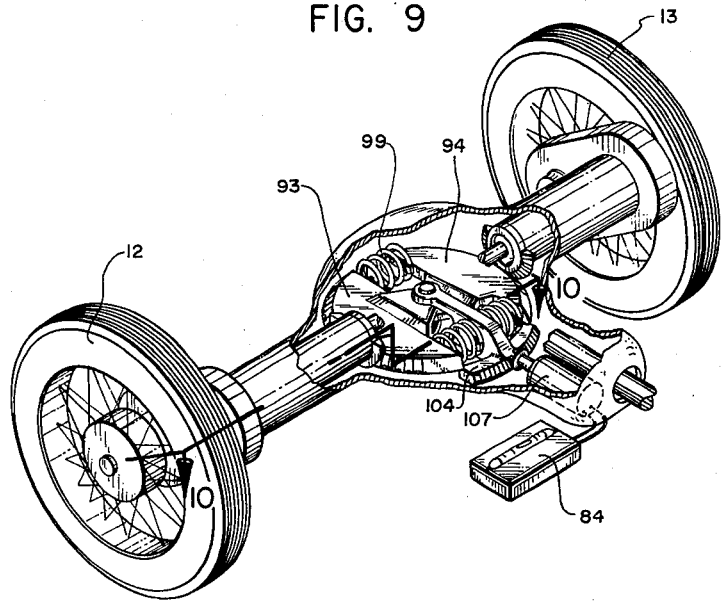
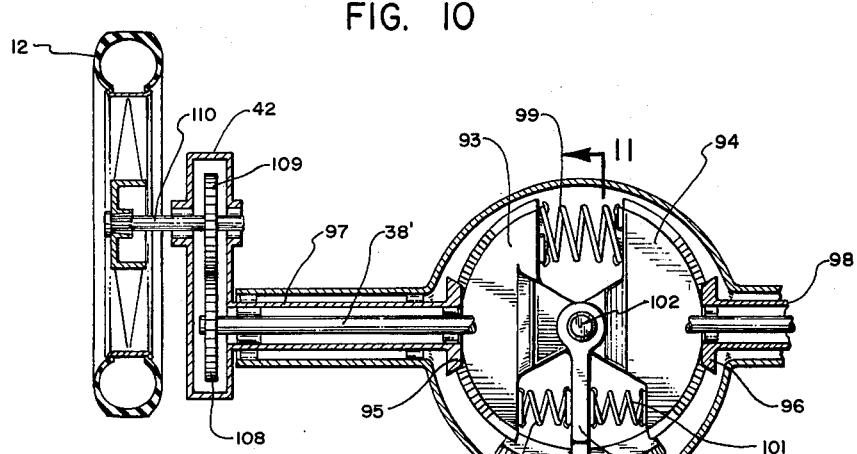
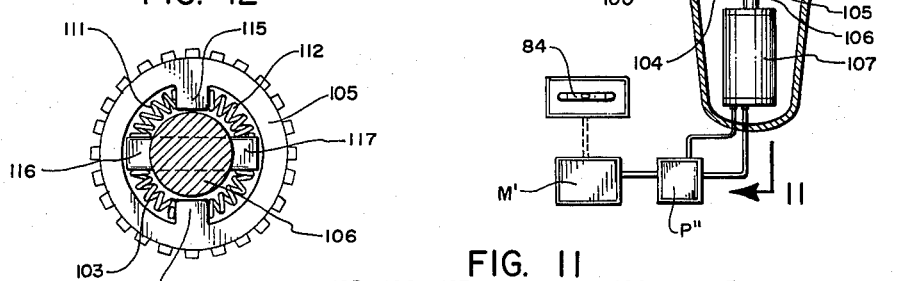
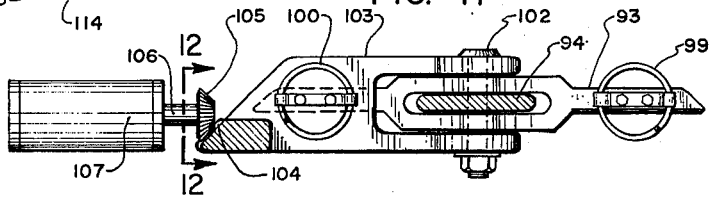

3,964,563

WHEEL-SUPPORT STRUCTURE IN VEHICLES

The present invention relates to vehicles and, more particularly, to a new and improved three-wheel vehicle and balance suspension system therefor, wherein means are provided with respect to the two oppositely-reciprocating wheels of the vehicle, to aid cornering as well as essentially erect travel even though the vehicle may be passing over undulating terrain.

An essential feature of the vehicle is that two wheels are intercoupled such that a downward movement of one wheel will automatically be accompanied by an upward movement of the remaining wheel. Provision is made for locking the coupling mechanism for purposes hereinafter described. Automatic as well as manual adjustment is present.

It will be seen from the following detailed description of operation that the integrity of vehicle orientation during travel is preserved against otherwise present tendencies to dip in the face of travel over undulating terrain or over bumps, chuck-holes, or dips.

Accordingly, a particular object of the present invention is to provide a new and improved three-wheel vehicle.

An additional object is to provide a balance suspension system for and in connection with vehicular structure.

An additional object is to provide in a vehicle a pair of tandem-connected wheels wherein the motions of one of said wheels is automatically correlated with the motion of the remaining wheel such that a minimum chance of dipping or spill is present.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 9 is a perspective view of an alternate, rear axle structure;

FIG. 10 is a longitudinal vertical section taken along the line 10—10 in FIG. 9;

FIG. 11 is a section taken along the line 11—11 in FIG. 10, and

FIG. 12 is a transverse section taken along the line 12—12 in FIG. 11.

Figure 1:
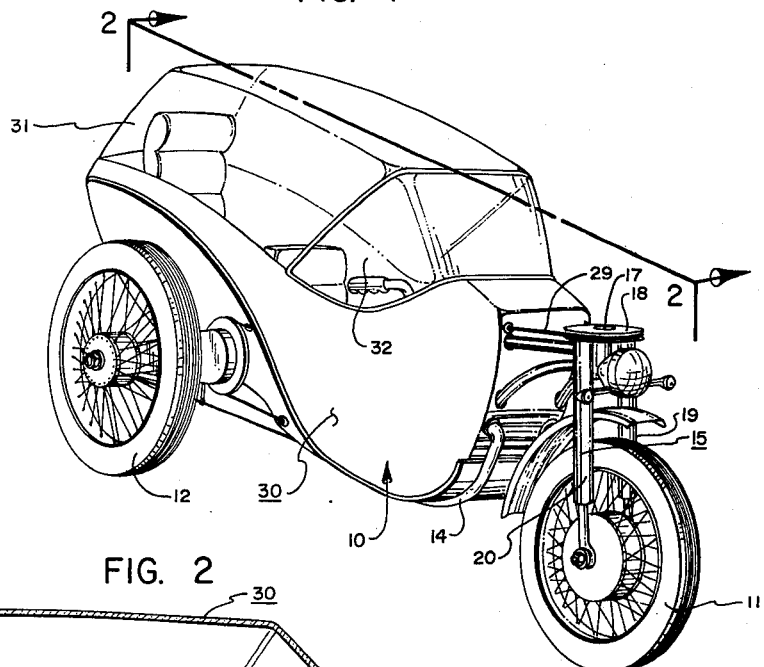
FIG. 1 is a perspective view of a vehicle incorporating the principles of the present invention.

The use of the oppositely-reciprocating herein refers, of course, to those two wheels, front or rear, which are coupled together to act oppositely and together as hereinafter explained.

In FIGS. 1–4 vehicle 10 is shown to include a front wheel 11 and also a pair of rear wheels 12 and 13.

Frame 14 is provided and at its forward extremity includes a front wheel fork 15 provided with a central vertical bore 16 accommodating bolt-axle 17.

Bolt-axle 17 fixes the disposition of pulley 18 relative to fork 15.

The fork 15 includes the usual cylinders 19 and 20 and, as by spring loading and/or pneumatic means, the depending rods 21, one of each side of front wheel 11. These depending rods include the usual axle 22 which serves as a pivot for front wheel 11. The structure including fork 15 will be typical and of conventional design with respect to standard motorcycles, save for the inclusion of a pulley 18.

This pulley and associated structure are used in place of the conventional handle bar unit proximate the fork. Frame 14 has the usual frame structure at 23 which provides a cradle mount 24 for securing combustion engine 25 in place. Handle bars 25 are pivotally mounted to frame 14 by an upstanding journal Post 27; the handle bars 26 may be journaled for pivoting about in an essentially horizontal or a slightly tilted plane, in the usual manner. The same includes, however, a fixed pulley 28 which is linked to pulley 18 by means of cable connection, e.g. an endless connector 29. This connector may include a simply conventional belt, a V-belt, a sprocket chain, or other suitable means. The essential feature is that the pivoting of the handle bars at 26 will effect the simultaneous pivoting of front wheel 11 in the usual manner; such is effected by a pivoting of the fork structure above the axis of pivot bolt 17 in FIG. 3. In lieu of a belt or chain, a cable might also be employed at 29' corresponding to 29 in FIG. 2, see FIG. 3.

Figure 2:
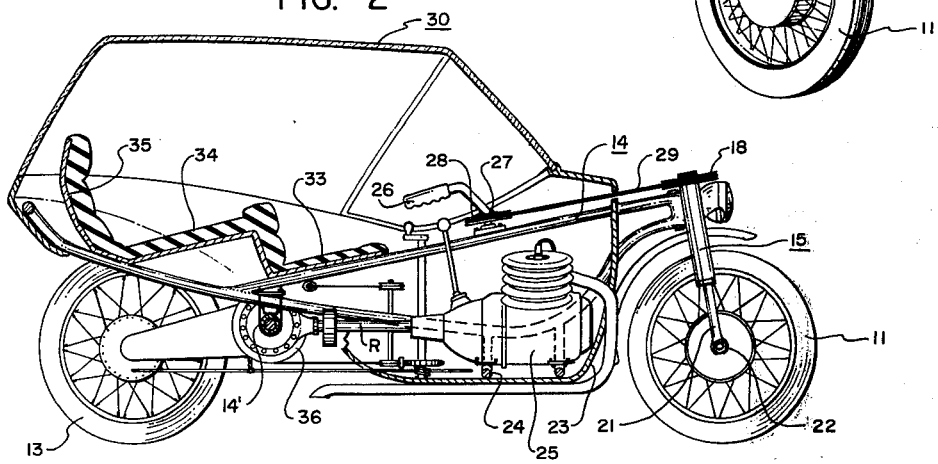
FIG. 2 is a longitudinal transverse section taken along the line 2—2 in FIG. 1.

A canopy or enclosure 30 may be provided and can be made of fiberglass or metal, having translucent window panels at 31 and 32, merely by way of example. Seats 33 and 34 are likewise provided as shown in FIGS. 1 and 2. The seats can be designed integrally to rest upon rigid structural support 35 attached to the frame. Mounted by U-bolts 14' to frame 14 is a differential housing 36 having oppositely extending arms 37 and 38. Pulley sets P and P' include fixed axles A and A' with pulleys 45, 46 and 51 journaled thereon as shown, and receive elongate connector means M with upper and lower courses U and U'.

Figure 6:
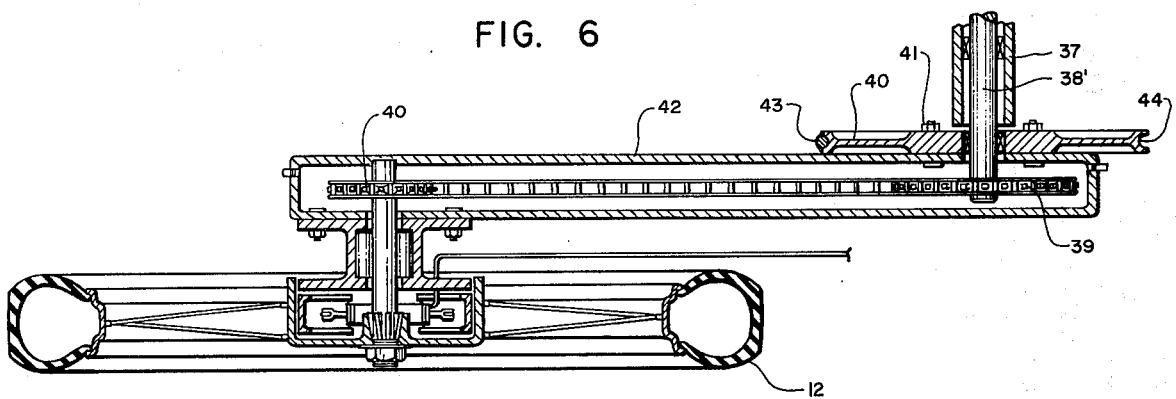
FIG. 6 is an enlarged fragmentary section taken along the line 6—6 in FIG. 4.

Arm 37 is shown, for example, in FIG. 6 and is seen to include the drive axle 38' to which is mounted sprocket 39. Pulley 40 is bolted by bolt means 41 to housing arm 42 and externally receives a cable 43 that is spot-welded within the groove 44. In lieu of the cable a sprocket and sprocket chain combination might be employed. Cable 43 is routed past idler pulleys 45 and 46 and also past and around pulley 47. The lower extremity of the cable at 48 is attached to spring 49 to lend resiliency as hereinafter explained. The opposite end of spring 49 is affixed to cable 50 which is routed past idler pulley 51 and leads to roller chain 52. Roller chain 52 may either comprise a separate segment or, and perhaps preferably, the entire cable may comprise a roller chain which is simply linked integrally together by means of springs 49 and 53. In any event, the remaining portion 54 proceeds around and past idler sprocket 55 to connect the spring 53. The remaining end of spring 53 is connected by the length 43 to proceed about sprocket 40. Cable 43 includes spring 43'.

At this point, the emergency hand brake system will be discussed. The brake lever 56 is pivoted at 57 and fulcrumed at 58. An actuating rod 59 is coupled to pivot connection 57 and is journaled in and through hydraulic brake cylinder 58. The latter includes a piston 58' which is fixed to rod 59. The brake lines 62 and 63 form emergency brake lines which lead to the conventional braking structure, not shown, at each of the wheels 12 and 13. To rod 59 is secured a multi-finger locking fork 65. Thus, the forward movement of the brake lever 56 will cause a return movement of the lower end thereof to move the locking fork 65 rearwardly and engage roller chain 52, thereby not only supplying pressured braking fluid at the wheels but also locking the relative disposition of wheels 12 and 13 with respect to each other as well as to the frame, thereby preventing continued reciprocal inverse oscillation of the wheels relative to each other.

The structure at the opposite end, i.e. 47 and 13 is essentially identical to that shown in FIG. 6.

Figure 4:
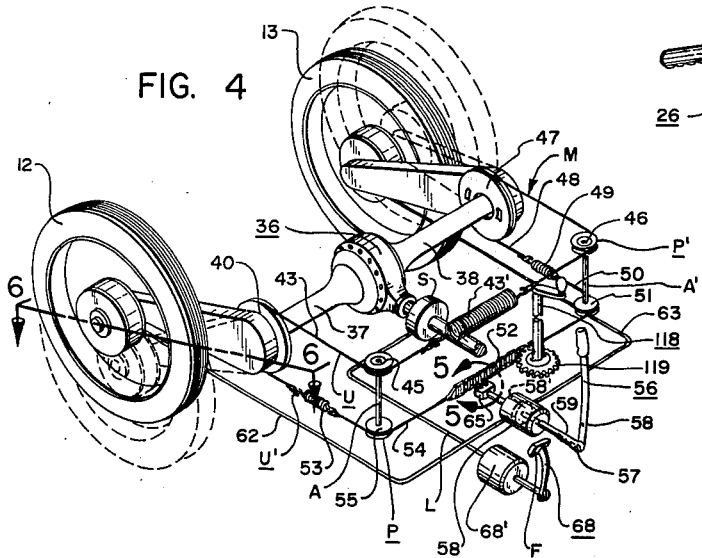
FIG. 4 is an enlarged perspective view of the rear wheels of the vehicle which are connected in tandem and provided with suitable controls.
Figure 3:
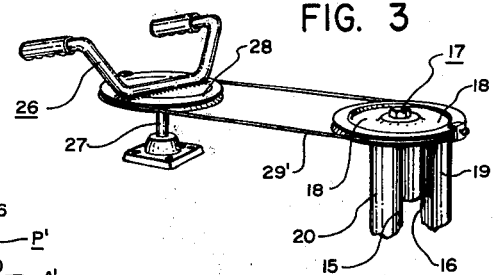
FIG. 3 is an enlarged perspective view of the front portion of the vehicle, principally at the handle control and yoke area.
Figure 5:
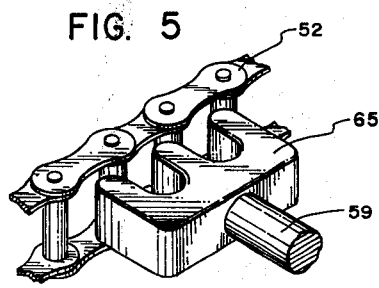
FIG. 5 is an enlarged perspective detail taken along the arcuate line 5—5 in FIG. 4.

An additional braking system 68 is also used and includes brake cylinder 68' actuated by foot pedal F and including hydraulic brake line L leading to a conventional brake shoe structure and braking drive shaft S. Braking system 68 is used for normal braking operations while the vehicle is in transit.

Where desired the auxiliary or emergency brake system can be provided as shown in FIG. 4 wherein there will be an absolute locking of the disposition of the wheels relative to their bell-crank structures so that, under park or emergency conditions, there will be no automatic re-pivotting of the wheels.

The operation of the structure shown in FIGS. 1 through 6 is as follows. Steering is accomplished by the handle bars 26 in the manner shown in FIG. 3 whereby the front wheel, for example, can be pivoted about an essentially vertical axis such that the vehicle may be steered to the right or to the left. During transit, should undulations, dips, or bumps be encountered, or should the side of the hill be traversed so as to lift upwardly the wheel 13 in FIG. 4, the intercoupling structure including the several pulleys and elongate connector system at M in FIG. 4 will provide a counter-movement to the remaining wheel 12 such that the same will descend downwardly to the dotted line configuration shown. This action serves to keep the axle arms at 37 and 38 along a horizontal line and hence stabilize the transverse axis of the vehicle.

When the vehicle is brought to a stop by customary brake pedal at 68, then the hand or emergency brake lever 56 is set so that the jaws or fork at 65 engage the chain segment at 52. This locks the oscillating action of the wheels.

There may also be times when it is desirous to actuate braking lever 56 while the vehicle is in transit. Such times occur especially when one of the wheels traverses a slick spot on an icy road, for example, while the other wheel is gripping the asphalt pavement there beneath. Suppose, in the case of FIG. 4, that wheel 12 traverses high-friction blacktop, whereas the wheel 13 is slipping on ice. The traction present at wheel 12 in company with the forward movement of the vehicle will tend to force downwardly the pulley area at 40 in FIG. 4 so as to tend to tilt the combined axle arms at 37 in a direction toward the bottom of wheel 12 and arm 38 upwardly in a direction toward the top of wheel 13. However, by virtue of the compensating system as per system M, the wheel 13 will tend to be forced upwardly, thus even further reducing the frictional contact of wheel 11 of the icy pavement. Such tipping is exactly what is not wanted and thus the user, upon initially experiencing this pivoting effect can set the fork or jaws at 65 against chain segment 52 so as to lock the two wheels in a fixed mutual inter-disposition. At the same time there can be applied a braking force at drum S when the lever 56 is urged forwardly for example. At the time that the chain segment 52 is gripped by the fork 65, the forward urging of piston 58' will simultaneously set the brakes at the wheels via lines 62 and 63. Accordingly, the emergency braking system at 56 offers a means wherein the operation, above described in this paragraph relative to said "tipping", can be neutralized or made non-operative where one of the rear wheels traverses an area differing in friction or gripping action relative to the other wheel land its surface. The safest braking action, of course, is by virtue of brake S associated with system 68.

Figure 7:
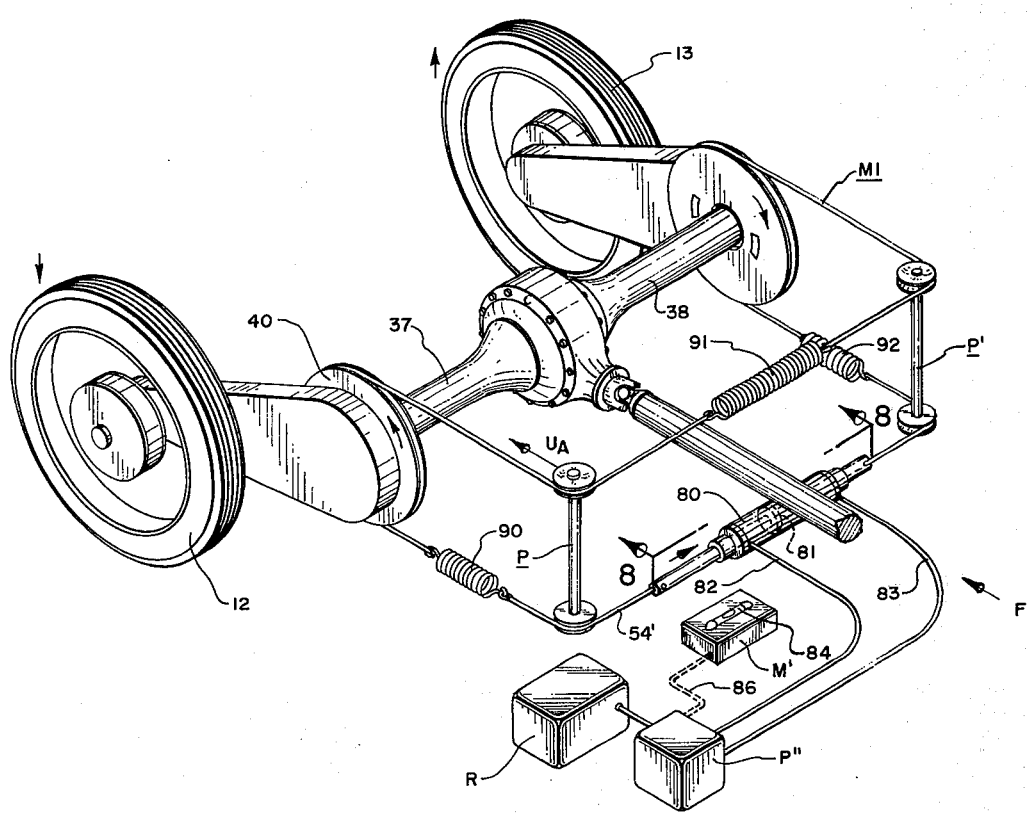
FIG. 7 is an enlarged perspective view, similar to FIG. 4, but which includes alternate control structures and mechanisms.

In FIG. 7 wheels 12 and 13 are coupled together by elongate connector system M1, similar to M in FIG. 4, and utilize pulley sets P and P' and system springs 90–92. The lower course 54' includes hydraulic piston rod 81', including piston 81, of hydraulic cylinder 80. Cylinder 80 is coupled by hydraulic lines 82 and 83 to a reversible pump P'', merely by way of example, and supplied hydraulic fluid by reservoir R. The pump is driven by reversing motor M' equipped with conventional mercury tilt switch 84. Accordingly, motor M'is "off" when the tilt switch is level, drives pump P in one direction when tilt switch tilts with the vehicle frame in one direction away from the horizontal, and drives the pump in the reverse direction when the tilt switch tilts in an opposite direction. Tilt-switch reversing valve/-pump systems standing alone are conventional and of themselves form no part of the present invention.

In FIG. 7 let us assume that the wheel 12 has suddenly traversed a dip so that wheel 12 moves downwardly. Should the effective bell crank axle structures associated with the wheels remain in a fixed position, then the transverse axis of the vehicle would tip in the direction toward the bottom of wheel 12. The device 84, however, will sense this tipping action so that hydraulic fluid will be pumped through line 82, tending to force the piston 81 in a direction to the upper right of the drawing. This in turn will rotate in a counter clockwise direction the pulley 40 so as to tend to lift the outer extremity of arm 37 and lower the outer extremity of armr 38. Exactly the same action will occur should, instead of wheel 12 hitting a depression, wheel 13 hits a bump. Accordingly, the wheels 12 and 13 are mutually oppositely reciprocating in the sense that, where one wheel experiences a vertical movement, the remaining wheel will move in an opposite direction so that the transverse axis of the combined axles at 37 and 38 remain essentially horizontal. It is to be noted in connection with FIGS. 7 and 8 that springs 90, 91, and 92 are simple shock absorbing springs and actually will tend to take up slight rapid shock owing to the traverse of small bumps. Aiding or reinforcing this action is the inclusion of springs C and D in FIG. 8, which springingly biases piston 81 relative to stops Q and Q'. Accordingly, for rises or bumps of pronounced duration or extent, it is the leveling action as produced by the system including device 84 which serves to adjust the wheels over large "swirls" or undulation areas in the action hereinbefore mentioned. For bumps of very short duration, then the springs C and D will come into play as hereinbefore described.

Figure 8:
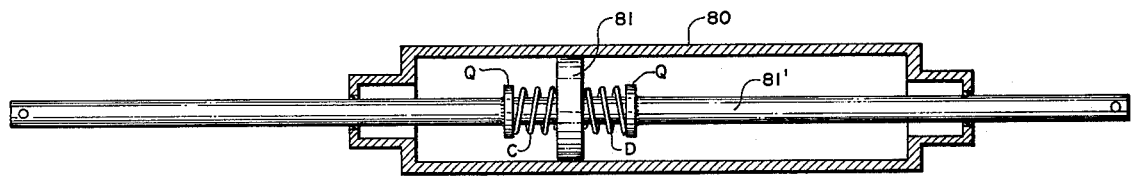
FIG. 8 is an enlarged longitudinal, vertical section taken along the line 8—8 in FIG. 7.

In connection with FIG. 8, springs C and D will be relatively light springs, of course, wherein springs 90–92 in taking the weight of the vehicle will be relatively stiff springs.

An optional system is illustrated in FIGS. 9–12 wherein a pair of bevel gear segments 93 and 94 are coupled to bevel gears 95 and 96 associated with sleeve shafts 97 and 98. Springs 99, 100 and 101 are supplied to couple the segments together and more particularly add resiliency to the system. Gear segments 93 and 94 are mounted upon post 102. Likewise mounted upon post 102 is an arm 103 which includes a bevel gear segment 104. Opposite sides of the arm are engaged by the said compression springs 100 and 101. A bevel gear 105 matches with segment 104 and is keyed to shaft 106 of hydraulic fluid motor 107. The latter is coupled to pump P'', driven by reversing motor M', which is reversed by alternate tippings of tilt switch 84. The differential connection to the drive line at R in FIG. 2 will be exactly the same as previously. Also, in its environment it is seen that axle shaft 38' is now provided with a drive gear 108 which meshes with driven gear 109 pinned to stub axle 110. This is a substitute structure for FIG. 6 associated with representative wheel 12. The opposite wheel may be similarly provided with the gearing shown in FIG. 10. To lend resiliency to the structure, the shaft 106 may be coupled to gear 105 in the manner shown in FIG. 12, wherein a series of springs 111–113 are interposed between cogs 114 and 115 and shaft protuberances 116 and 117. These springs compensate for rapid oscillations as might occur and serve the very same function as springs C and D in FIG. 8.

Where desired, gear 105 and shaft 106 may, be conventional structure, be made selectively withdrawable from gear 105 in FIG. 11, so as to release temporarily the power-balance feature and render the system simply self-balancing as during highway travel. In FIGS. 7 and 9, these structures can be operatively locked simply by disconnecting the mercury tilt-switch at 84, for example, by switch or other conventional means.

Accordingly, where the motor shaft 106 is revolved clockwise, then there with be a rotational displacement in a counter-clockwise direction of the unit including gears 93 and 94 so as to produce a rotation of gears 95 and 96 and a resultant counter-movement of opposite housing arms 42.

Referring back to FIG. 4, if desired, a handle crank 118 may be employed and be provided with a gear or sprocket 119 which engages segment 52. Thus, the revolvement of handle crank 118 will be transmitted via member 119 so that there will be a movement, to the right or left, of segment 52, thus achieving a mutual re-orientation of wheels 12 and 13; such new orientation can be locked by fork 65 as aforesaid.

The subject structures illustrate three-wheel suspension systems, incorporating motor-cycle type tires at 11–13, which systems are self-levelling for a variety of terrains including cross-country rides for example. The subject vehicle will be especially useful for outdoor work, for rescue work, and for military vehicles, as well as for farm equipment.

The balance-type structures of the invention also aid in the turning or cornering of the vehicle, the inside wheel moving up and the outside wheel moving down, to counter centrifugal force and restore equal road pressure to the opposite wheels. An inward "lean" by the user during turns enhances this effect.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A vehicle including, in combination, a frame, an engine mounted to said frame, a first wheel, means coupled to said frame for pivotally supporting said first wheel proximate an extremity of said frame, second and third wheels having stub axles disposed in a mutual, horizontally-shifting vertical plane, said stub axles each being provided with driven power means, differential structure having transmission drive line structure coupled to said engine and a pair of axially aligned, oppositely extending axles each having drive power means coupled to said driven power means, a pair of housing arms disposed on opposite sides of said vehicle and respectively encasing said drive and driven power means, a pair of pulleys fixed to respective ones of said housing arms and being journaled with respect to said oppositely extending axles, a pair of pulley sets each having a fixed vertical axle and upper and lower idler pulleys horizontally mounted thereto, flexible elongate connector means keyed to and intercoupling said housing pulleys and having upper and lower courses traversing about said upper pulleys and said lower pulleys of said pulley sets, respectively, whereby a vertical movement of one of said second and third wheels will produce an opposite, compensating vertical movement in the remaining of said second and third wheels such that said oppositely extending axles always remain essentially horizontal, and means for releasably locking said flexible elongate connector means against movement, whereby to temporarily essentially fix the relative mutual disposition of said housing arms.

2. The structure of claim 1 wherein said elongate connector means includes shock-absorbing spring means interposed in said upper and lower courses thereof.

3. The structure of claim 1 wherein said drive and driven power means comprise sprockets keyed to said stub axles and said oppositely extending axles and a pair of endless sprocket chains respectively intercoupling said sprockets on opposite sides of said vehicle, respectively.

4. A vehicle including, in combination, a frame, an engine mounted to said frame, a first wheel, means coupled to said frame for pivotally supporting said first wheel proximate an extremity of said frame, second and third wheels having stub axles disposed in a mutual, horizontally-shifting vertical plane, said stub axles each being provided with driven power means, differential structure having transmission drive line structure coupled to said engine and a pair of axially aligned, oppositely extending axles each having drive power means coupled to said driven power means, a pair of housing arms disposed on opposite sides of said vehicle and respectively encasing said drive and driven power means, a pair of pulleys fixed to respective ones of said housing arms and being journaled with respect to said oppositely extending axles, a pair of pulley sets each having a fixed vertical axle and upper and lower idler pulleys horizontally mounted thereto, and elongate connector means keyed to and intercoupling said housing pulleys and having upper and lower courses traversing about said upper pulleys and said lower pulleys of said pulley sets, respectively, whereby a vertical movement of one of said second and third wheels will produce an opposite, compensating vertical movement in the remaining of said second and third wheels such that said oppositely extending axles always remain essentially horizontal, and wherein said vehicle is provided with actuatable means for selectively arresting elongate connector means movement, and wherein one of said courses includes a chain segment, said actuatable means including a journaled, reciprocable rod provided with end jaw means for engaging said chain segment, and fulcrumed lever means pivotally coupled to said rod for selectively advancing said jaw means toward said chain segment.

5. The structure of claim 4 wherein said vehicle is provided with an auxiliary braking system having a hydraulic brake cylinder journaling said reciprocable rod and a brake piston coupled to said rod.

6. In a vehicle having a motor, a transmission coupled to said motor, a differential having oppositely extending axle shafts and coupled to said transmission, axle shaft housing means encasing said axle shafts, a pair of opposite wheels, and side-opposite lever structures pivotal with respect to said axle shaft housing means for supporting said wheels and also for operatively coupling said wheels to said axle shafts: an improvement comprising means, including flexible elongate connector means directly coupled to said side-opposite lever structures, intercoupling said side-opposite lever structures for mutually oppositely-reciprocating movement; and means coupled to said intercoupling means for releasably locking said intercoupling means and said wheels in a temporary, essentially fixed position.

* * * * *